(12) United States Patent
Kashani et al.

(10) Patent No.: US 11,743,719 B2
(45) Date of Patent: Aug. 29, 2023

(54) SYSTEM AND METHOD FOR AUTHENTICATING AN OCCUPANT OF A VEHICLE

(71) Applicant: Denso Corporation, Kariya (JP)

(72) Inventors: Ameer Kashani, Southfield, MI (US); Gopalakrishnan Iyer, Santa Clara, CA (US)

(73) Assignee: Denso Corporation, Kariya (JP)

( * ) Notice: Subject to any disclaimer, the term of this patent is extended or adjusted under 35 U.S.C. 154(b) by 347 days.

(21) Appl. No.: 16/594,389

(22) Filed: Oct. 7, 2019

(65) Prior Publication Data

US 2021/0105619 A1  Apr. 8, 2021

(51) Int. Cl.
| | |
|---|---|
| *H04L 29/06* | (2006.01) |
| *H04W 12/06* | (2021.01) |
| *H04L 9/40* | (2022.01) |
| *G06F 21/32* | (2013.01) |
| *G06F 21/62* | (2013.01) |
| *G10L 15/25* | (2013.01) |
| *H04W 4/38* | (2018.01) |
| *H04W 4/40* | (2018.01) |
| *H04W 12/30* | (2021.01) |
| *G06V 40/20* | (2022.01) |

(52) U.S. Cl.
CPC ............ *H04W 12/06* (2013.01); *G06F 21/32* (2013.01); *G06F 21/629* (2013.01); *G06V 40/20* (2022.01); *G10L 15/25* (2013.01); *H04L 63/20* (2013.01); *H04W 4/38* (2018.02); *H04W 4/40* (2018.02); *H04W 12/35* (2021.01)

(58) Field of Classification Search
CPC ....... H04L 63/20; G06F 21/32; G06F 21/629; H04W 12/06; H04W 4/38; H04W 12/35; G06K 9/00335; G10L 15/25
See application file for complete search history.

(56) References Cited

U.S. PATENT DOCUMENTS

| | | | |
|---|---|---|---|
| 5,812,067 A | 9/1998 | Bergholz et al. | |
| 6,952,155 B2 | 10/2005 | Himmelstein | |
| 11,003,798 B1* | 5/2021 | Mhaske | ................ G06F 21/629 |

(Continued)

FOREIGN PATENT DOCUMENTS

| | | | | |
|---|---|---|---|---|
| CN | 1494711 A | | 5/2004 | |
| DE | 102014111883 | * | 3/2016 | ......... G07C 9/00563 |

(Continued)

OTHER PUBLICATIONS

Derman et al., "Continuous Real-Time Vehicle Driver Authentication Using Convolutional Neural Network Based Face Recognition", Turkey, 8 pages.

*Primary Examiner* — Joseph P Hirl
*Assistant Examiner* — Chi D Nguy
(74) *Attorney, Agent, or Firm* — Dickinson Wright PLLC (57) ABSTRACT

A system in a vehicle includes one or more sensors configured to obtain occupant information from an occupant utilizing at least facial information of the occupant. The system also includes a controller in communication with the one or more sensors. The controller is configured to determine an application policy associated with one or more applications of the vehicle and execute the one or more applications in response to facial information exceeding a first authentication layer or second authentication layer associated with the application policy.

20 Claims, 3 Drawing Sheets

(56) References Cited

U.S. PATENT DOCUMENTS

| | | | |
|---|---|---|---|
| 2003/0054800 A1 | 3/2003 | Miyashita | |
| 2003/0084289 A1 | 5/2003 | Watanabe | |
| 2004/0220798 A1 | 11/2004 | Chi et al. | |
| 2014/0359722 A1* | 12/2014 | Schultz | H04L 63/0861 726/5 |
| 2018/0201226 A1* | 7/2018 | Falkson | B60R 25/257 |
| 2018/0247037 A1 | 8/2018 | Weller et al. | |
| 2018/0307815 A1* | 10/2018 | Samadani | G06V 40/45 |
| 2019/0016281 A1* | 1/2019 | Liu | B60R 25/257 |
| 2019/0108407 A1 | 4/2019 | Okayasu | |
| 2019/0156003 A1* | 5/2019 | Alameh | G06F 21/32 |
| 2019/0370578 A1* | 12/2019 | Meng | B60W 50/14 |
| 2020/0135190 A1* | 4/2020 | Kaja | G06V 40/172 |
| 2020/0394293 A1 | 12/2020 | Hirabayaski et al. | |
| 2021/0174813 A1* | 6/2021 | Huh | G06N 3/08 |
| 2022/0135618 A1 | 5/2022 | Igawa et al. | |

FOREIGN PATENT DOCUMENTS

| | | | | |
|---|---|---|---|---|
| EP | 0761514 A1 | | 3/1997 | |
| JP | 2003091509 A | | 3/2003 | |
| JP | 2003132023 A | | 5/2003 | |
| JP | 2004276783 A | | 10/2004 | |
| JP | 2011215942 A | | 10/2011 | |
| JP | 2012203428 A | | 10/2012 | |
| KR | 20170100722 A | * | 2/2016 | E05B 19/0082 |

\* cited by examiner

| Application Feature | Identity A | Identity B | ... | Identity N |
|---|---|---|---|---|
| Feature A | Value* | Value* | ... | Value* |
| Feature B | Value* | Value* | ... | Value* |
| ... | ... | ... | ... | ... |
| Feature N | Value* | Value* | ... | Value* |

FIG. 3

SYSTEM AND METHOD FOR AUTHENTICATING AN OCCUPANT OF A VEHICLE

TECHNICAL FIELD

The present disclosure relates to occupant authentication in a vehicle.

BACKGROUND

Vehicle systems may authenticate occupants in a vehicle to make sure the appropriate occupants are operating the appropriate features in the vehicle. In another example, vehicle systems may be utilized to prevent cyber-attacks carried out on the vehicle. For example, voice recognition systems may be susceptible to "dolphin attacks," which may be an attack hidden by high-frequency sounds that our voice assistants can detect, but the human ear cannot hear.

SUMMARY

According to one embodiment, a system in a vehicle includes one or more sensors configured to obtain occupant information from an occupant utilizing at least facial information of the occupant. The system also includes a controller in communication with the one or more sensors. The controller is configured to determine an application policy associated with one or more applications of the vehicle and execute the one or more applications in response to facial information exceeding a first authentication layer or second authentication layer associated with the application policy.

According to a second embodiment, a system in a vehicle includes one or more sensors configured to obtain occupant information from one or more occupants utilizing at least facial information of the occupant, a wireless transceiver in communication with a mobile device, and a controller in communication with the one or more sensors and the wireless transceiver. The controller is configured to identify the occupant from at least the facial information and the mobile device, determine an application policy associated with one or more applications, wherein the application policy is associated with at least a first authentication layer and a second authentication layer, execute the one or more applications in response to facial information exceeding the first authentication layer or second authentication layer associated with the application policy.

According to a third embodiment, a method in a vehicle includes obtaining facial information and voice information from an occupant utilizing at least a camera and microphone in the vehicle, identifying the occupant utilizing at least the facial information and the voice information, determining an application policy associated with one or more applications in response to the identification of the occupant, and executing the one or more applications in response to facial information and voice information exceeding a first authentication layer or second-authentication layer associated with the application policy.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Voice recognition systems are becoming more popular, especially in a vehicle environment. Voice recognition systems and virtual assistants are becoming more personalized and tailored to individual users. Voice recognition systems may automatically recognize individual users by extracting distinctive features related to their acoustic patterns. Voice recognition systems may utilize a "wake word," such as "OK Google," "Hey Siri," or "Alexa" and subsequently process natural language requests following from an individual user. Similarly, automotive voice assistants integrated into in-vehicle infotainment systems may utilize wake words such as "Hey Mercedes" or "Hey BMW". Virtual assistants may process requests from recognized users and provide access to privileged functionalities or authorize critical system operations. For example, after recognizing an enrolled user, a virtual assistant may dynamically respond to the user's speech by modifying, sharing or transmitting personal information, conducting financial transactions, creating new appointments, adjusting vehicle parameters such as speed, destination, or reconfiguring other critical in-vehicle features/services, and so forth. With the growing diffusion of self-driving vehicles and ride-sharing services, passengers are increasingly sharing transportation with unknown parties. Relying on acoustic pattern feature extraction to recognize individual users may be prone to inaccuracies and leave virtual assistants susceptible to cyberattacks such as spoofing. For example, a malicious actor may impersonate the voice of another vehicle occupant by capturing and replaying it directly, or use a dataset of samples captured a priori to train a Generative Adversarial Network (GAN) and produce compelling, arbitrary speech with the victim's acoustic pattern. Researchers have found a way to utilize ultrasonic audio commands that voice recognition systems can hear, but humans cannot to covertly control virtual assistants. Some cyberattacks may translate a standard human voice command and broadcast the translation into ultrasonic frequencies, sometimes called a "dolphin attack." Such frequencies are not possible for humans to hear, but voice recognition systems may still utilize the ultrasonic commands. It may be beneficial for vehicle systems to combat such attacks.

Occupant identity may be continuously classified using various techniques, such as facial recognition, acoustic patterns, biometric profiles, behavioral models, association of a driver or user via a key fob or mobile device, association of a driver or user via a shared secret such as a passphrase or PIN code, analysis of vehicle seat settings, body weight information collected from seat sensors, etc. In one embodiment, when an application feature requires a higher level of assurance, it may request occupant state information from an occupant monitoring system (OMS). In response to the request, the OMS may transmit the occupant state information continually to the application. An application may have a requisite occupant state in order to access certain features of the application. The application may also correlate critical features of the application with the occupant state information to determine implausibility and deviations from expected behavior caused by the presence of a fault or cyberattack. The application may be preconfigured with validation instructions as part of a data validation engine.

Figure 1:
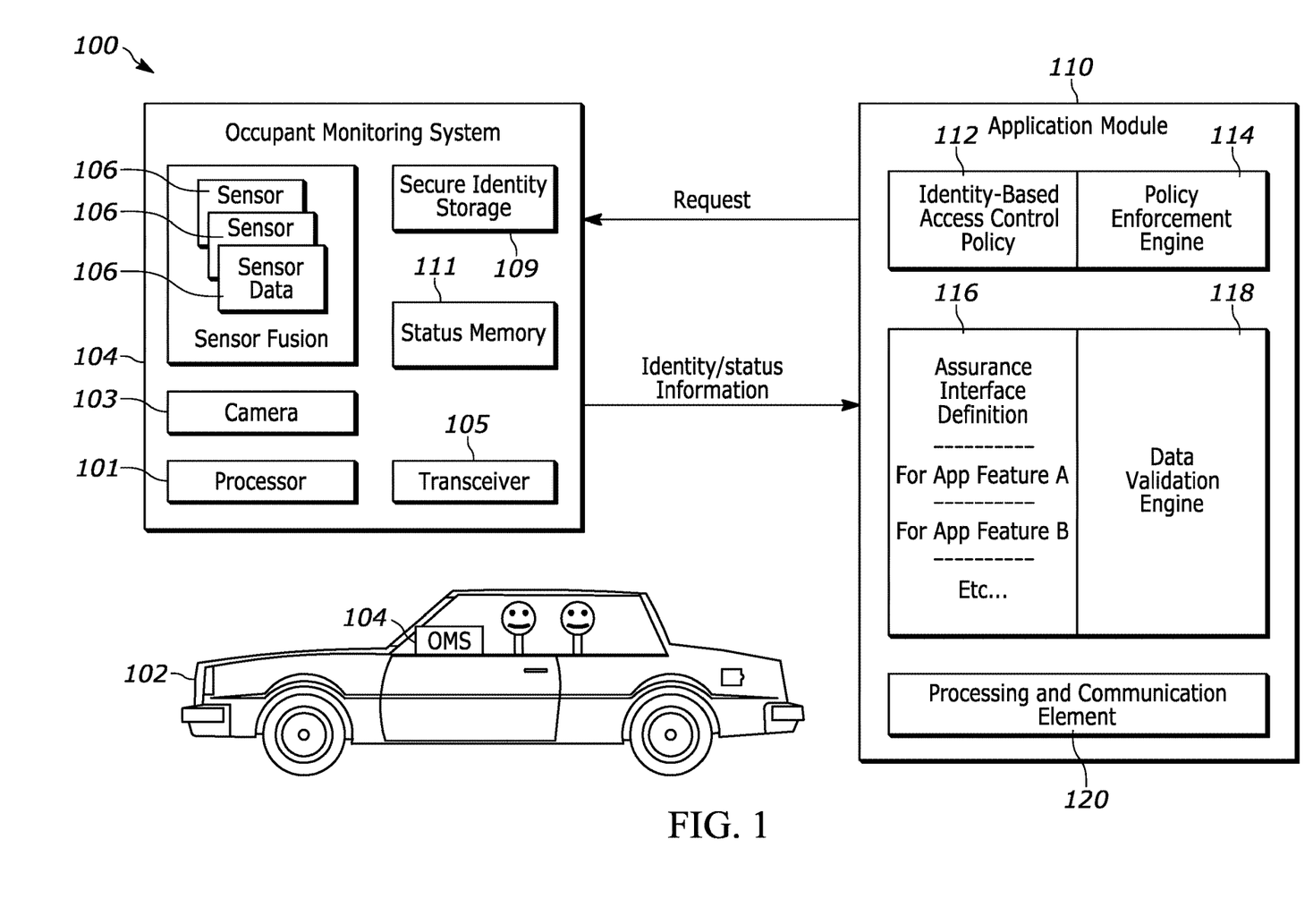
FIG. 1 illustrates an example block diagram of a vehicle system 100.

FIG. 1 illustrates an example block diagram of a vehicle system 100 for a vehicle 102. The vehicle 102 may include any type of vehicle, such as a passenger vehicle, a commercial vehicle, motorcycle, sport utility vehicle, minivan, sedan, motorcycle, watercraft, off-road vehicle, etc. The vehicle system 100 may include a controller 101 (also referred to as a processor 101 and/or an electronic control unit (ECU) 101). The processor 101 may be configured to carry out instructions for the methods and systems described herein. The processor 101 may be one or more computing devices such as a single or multi-core processor for processing commands, such as a computer processor, microprocessor, microcontroller, or any other device, series of devices or other mechanisms capable of performing the operations discussed herein. The controller 101 may include memory (not individually shown in FIG. 1), as well as other specific components for processing within the vehicle 102. The memory may store instructions and commands. The instructions may be in the form of software, firmware, computer code, or some combination thereof. The memory may be in any form of one or more data storage devices, such as volatile memory, non-volatile memory, electronic memory, magnetic memory, optical memory, or any other form of data storage device. In one example, the memory may include removable memory components.

The controller 101 may be in communication with various sensors, modules, and vehicle systems both within and remote of the vehicle 102. The vehicle system 100 may include various sensors, such as various cameras, a LIDAR sensor, a radar sensor, an ultrasonic sensor, or other sensor for detecting information about the surroundings of the vehicle, including, for example, other vehicles, lane lines, guard rails, objects in the roadway, buildings, pedestrians, etc. In the example shown in FIG. 1, the vehicle system 100 may include a camera 103 and a transceiver 105. The vehicle system 100 may also include a microphone, a global positioning system (GPS) module, a human-machine interface (HMI) display (not shown), as well as other sensors, controllers, and modules. FIG. 1 is an example system and the vehicle system 100 may include more or less sensors, and of varying types. The vehicle system 100 may be equipped with additional sensors at different locations within or on the vehicle 102 and/or remote of the vehicle 102, including additional sensors of the same or different type. As described below, such sensors may collect sensor data 106. The sensor data 106 may include any data collected by various sensors. Sensor data 106 may include image data, GPS data, vehicle speed data, vehicle acceleration data, voice recognition data, facial recognition data, biometric data, or any other data collected by various sensors or processors in the vehicle 102. Sensor fusion may be applied to the sensor data 106 to aggregate information, observe user interactions, build operational contexts, determine occupant state, identification of the occupant, and other items such as vehicle system usage patterns, objects handled by occupants, and so forth. Sensor fusion may occur in response to software that combines data from several sensors to improve an application or performance of a system or subsystem. Combining data from multiple sensors may correct for the deficiencies of the data collected by a specific type of individual sensor. Thus, sensor fusion may allow calculation of more accurate information. For example, if facial recognition data is utilized alone, it may have difficulty identifying an individual apart from another individual (e.g., one twin from another twin, etc.). By adding voice recognition data, the vehicle system 100 may have a higher probability of correctly identifying the individual from another individual.

The transceiver 105 may be a BLUETOOTH transceiver. In one illustrative embodiment, the vehicle system 100 uses the transceiver 105 (e.g., BLUETOOTH transceiver) to communicate with a user's mobile device (e.g., cell phone, smart phone, PDA, tablet, or any other device having wireless remote network connectivity). The mobile device can then be used to communicate with a network outside of the vehicle system 100 through, for example, communication with a cellular tower. In some embodiments, the tower may be a Wi-Fi access point.

If the user has a data-plan associated with the mobile device, it is possible that the data-plan allows for broad-band transmission and the vehicle system 100 may utilize a much wider bandwidth (speeding up data transfer). In still another embodiment, the mobile device is replaced with a cellular communication device (not shown) that is installed in the vehicle 102. In yet another embodiment, the mobile device may be a wireless local area network (LAN) device capable of communication over, for example (and without limitation), an 802.11 network (i.e., WiFi) or a WiMax network. In one embodiment, incoming data may be passed through the mobile device via a data-over-voice or data-plan, through the transceiver 105 and into the controller 101. In the case of certain temporary data, for example, the data may be stored on a hard disk drive (HDD), solid state drive (SSD), or another storage medium until such time as when the data is no longer needed.

In another embodiment, the transceiver 105 may be on an on-board communication device or cellular modem. The on-board communication device may not require a mobile device (e.g., cellular phone) to be paired with the transceiver 105 in order to communicate with an off-board server. Instead, the on-board communication device or cellular modem may have its own capability to communicate with an off-board network.

The camera 103 may be mounted in the vehicle 102 to monitor occupants (e.g., a driver or passenger) within a passenger cabin of the vehicle 102. The camera 103 may be part of an occupant monitoring system (OMS) 104. The camera 103 may be utilized to capture images of an occupant in the vehicle 102. The camera 103 may obtain facial information of an occupant, such as eye-movement, mouth-movement, and head-movement, as discussed further below. The camera 103 may be, for example, a color camera, infrared camera, radar/ultrasonic imaging camera, or time of flight camera. The camera 103 may be mounted on a head rest, on the dashboard, in the headliner, or in any other suitable location. Additionally or alternatively, the camera 103 may be located on a mobile device (e.g., tablet or mobile phone) and may capture the occupant's (e.g., driver or passenger) face, torso, limbs, eyes, mouth, etc.

The controller 101 may receive occupant information from the OMS 104 to determine an abnormal situation within the vehicle 102. The OMS 104 may employ one or more activity sensors such as a driver-facing camera, a passenger-facing camera, a health scanner, and an instrument panel to monitor activities performed by the occupants (e.g., driver or passenger). Based on the activity sensors, the OMS 104 may determine whether the driver is, for example, distracted, sick, or drowsy as the abnormal situation. For example, a passenger-facing camera may be employed in a vehicle headliner, vehicle headrest, or other area of the vehicle 102 to monitor activity of the passenger. The OMS 104 may also employ a microphone that is in communication with a voice recognition (VR) engine that can capture voice information of an occupant. The voice information may be utilized for voice commands in a voice recognition session. Based on the various sensors, the OMS 104 may determine whether the occupant is (e.g., driver or passenger), for example, fuss, experiencing motion sickness, hunger, fever, etc.

In another example, the OMS 104 may include a health scanner mounted on a seat of the vehicle 102, to a child seat, or another suitable location which the occupant touches or is positioned in the line of sight thereof. The health scanner may scan the occupant's heartbeat, blood pressure, pulse, or other health related information. The OMS 104 processes data received from the health scanner and monitors whether the occupant is suffering from a severe physical condition or episode. The OMS 104 may also be utilized with the health scanner to determine if various fluctuations in data may identify stress or issues with the occupant.

The vehicle system 100 may also include one or more external cameras located on the vehicle 102. The external camera may be mounted to the rear-view mirror, side-view mirrors, doors, fenders, roof/pillars, or bumpers either independently or in conjunction with another external vehicle component such as illumination devices, ornamental objects, or handles, etc. The external camera may also be facing out of the vehicle cabin through a vehicle's windshield to collect imagery data of the environment in front of the vehicle 102. The external camera may be utilized to collect information and data regarding the front of the vehicle 102 and for monitoring the conditions ahead of the vehicle 102. The camera may also be used for imaging the conditions ahead of the vehicle 102 and correctly detecting the position of lane markers as viewed from the position of the camera and the presence/absence, for example, of lighting of the head lights of oncoming vehicles. For example, the external camera may be utilized to generate image data related to vehicle's surrounding the vehicle 102, lane markings ahead, and other object detection. The vehicle 102 may also be equipped with a rear camera (not shown) for similar circumstances, such as monitoring the vehicle's environment around the rear proximity of the vehicle 102. When equipped with more than one external camera, the vehicle 102 may combine individual fields of view to provide a collective field of view and may also stream the imagery in real-time to local or remote consumers. In another example, the OMS 104 may share information by sending messages directly to an application module 110 or indirectly by populating a local/remote database connected to the application module 110. The shared information may include time-indexed imagery data (e.g., including a time stamp) along with specific data corresponding to detected events/conditions, such as the occupant events previously described.

In another embodiment, the vehicle system 100 may be equipped with a sound identification device (e.g., microphone). The microphone may determine a probability that the sound data corresponds to a pre-defined sound or sound model based on a subset of temporal parameters. For example, the microphone may apply an algorithm (e.g., trained deep-neural-network) to determine if an occupant event has occurred. The algorithm may take a number of inputs corresponding to the number of temporal parameters. Each acoustic feature vector may include a number of features and temporal parameters that are determined for each acoustic feature. Of course, in other embodiments, the number of parameters may vary. The deep-neural-network algorithm of the illustrative microphone may have previously been trained using machine learning in order to accurately determine if the sound data matches a pre-defined sound. The deep-neural-network algorithm may employ a softmax layer, backpropagation, cross-entropy optimization, and reinforcement learning as part of the training. This training may include supplying samples of sounds that match the pre-defined sound and samples of sounds that do not match the pre-defined sound, such as sounds similar to expected background noise. For example, if the pre-defined sound is an infant crying, the algorithm may be provided with a number of samples of infants crying as well as sounds similar to expected background noise such as adult conversation, road traffic noise, and other vehicle sounds. In some embodiments, the microphone may determine whether the sound corresponds to several different pre-defined sounds, such as a "wake word," such as "OK Google," "Hey Siri," or "Alexa". In other embodiments, the microphone may perform automated speech recognition (ASR) to transcribe occupant (e.g., driver or passenger) commands or conversations for consumption by vehicle services (e.g., services provided by an application module 110). The microphone may also allow users to register their "voiceprint" and perform automated recognition of such users by correlating acoustic features learned by the aforementioned algorithm.

The vehicle system 100 may also include GPS to detect or determine a current position of the vehicle 102 (not shown). In some circumstances, the GPS may be utilized to determine a speed that the vehicle 102 is traveling at. In other circumstances, the GPS may be utilized to localize the vehicle 102 according to a geographic coordinate system. The vehicle system 100 may also include a vehicle speed sensor (not shown) that detects or determines a current speed that the vehicle 102 is traveling at. The vehicle system 100 may also include a compass or three-dimensional (3D) gyroscope that detects or determines a current direction of the vehicle 102. Map data may be stored in the memory. The controller 101 may update the map data with sensor data 106. The map data may include information that may be utilized with an advanced driver assistance system (ADAS). The map data may include detailed lane information, slope information, road curvature data, lane marking-characteristics, etc. The map data may be utilized in addition to traditional map data such as road names, road classification, speed limit information, etc. The controller 101 may utilize data from the GPS, as well data/information from the gyroscope, vehicle speed sensor, 3D point clouds representing surrounding objects, and map data, to determine a location or current position of the vehicle.

The vehicle system 100 may also include a human-machine interface (HMI) display (not shown). The HMI display may include any type of display within the passenger cabin of the vehicle 102, such as a dashboard display, navigation display, multimedia display, virtual-reality headset, holographic projector, heads-up display (HUD), thin-film transistor liquid-crystal display (TFT LCD), etc. The HMI display may also be connected to speakers to output sound related to commands or the user interface of the vehicle 102. The HMI display may be utilized to output various commands or information to occupants (e.g., driver or passengers) within the vehicle 102. For example, when an occupant sitting in a rear-seat is stressed-out, the HMI display may display a message to the driver that the occupant sitting in the rear-seat is stressed-out and needs comfort. The HMI display may utilize any type of monitor or display utilized to display relevant information to the occupants. The HMI display may also include the HUD that displays an interface and other objects on a windshield of the vehicle 102 so that the images are within a driver's periphery while driving or in an occupant's line of sight.

In addition to providing visual indications, the HMI display may also be configured to receive user input via a touch-screen, user interface buttons, etc. The HMI display may be configured to receive user commands indicative of various vehicle controls such as audio-visual controls, autonomous vehicle system controls, certain vehicle features, cabin temperature control, etc. The controller 101 may receive the user input and in turn command a relevant vehicle system or component to perform in accordance with the user input. The HMI display may also include a display that is embedded into a headrest of the vehicle 102. The HMI display that is embedded into the headrest may also include a built-in camera that can face the occupant. The HMI display may be facing the occupant (e.g., driver or passenger) of the vehicle 102 to allow the occupant to interact with the HMI display and/or to monitor issues.

The controller 101 may receive information and data from the various vehicle components including the camera 103, the GPS, the HMI display, etc. For example, the controller may receive image data from the camera 103 and location data from the GPS. The controller 101 utilizes such data to provide vehicle functions that may relate to driver assistance or autonomous driving. For example, data collected by a camera, microphone, and forward camera may be utilized in context with the GPS data and map data to provide or enhance functionality related to adaptive cruise control, automatic parking, parking assist, automatic emergency braking (AEB), etc. The controller 101 may be in communication (e.g., Controller Area Network (CAN) Bus, Local Interconnect Network (LIN) Bus, Media Oriented Systems Transport (MOST) Bus, USB, etc.) with various systems of the vehicle (e.g., the engine, transmission, brakes, steering mechanism, display, sensors, user interface device, etc.). For example, the controller 101 may be configured to send signals to the brakes to slow the vehicle 102, or the steering mechanism to alter the path of vehicle 102, or the engine or transmission to accelerate or decelerate the vehicle 102. The controller 101 can be configured to receive input signals from the various vehicle sensors and to send output signals to the display device, for example. The controller 101 may also be in communication with other vehicles, one or more databases, memory, the internet, or networks for accessing additional information (e.g., maps, road information, weather, vehicle information). The controller 101 may also be utilized with the camera 103 to identify facial features of an occupant (e.g., driver or passenger) of the vehicle 102, as explained in more detail below.

The OMS 104 may also be utilized to monitor voice information spoken from occupants of the vehicle 102. The voice information may be spoken into one or more microphones located in the vehicle 102. The voice information may be analyzed by determining a pitch, fluctuation, or other anatomical or behavioral attributes to identify a specific occupant associated with that voice. For example, the OMS 104 may identify a certain voice with one user and another voice with another user. Furthermore, the OMS 104 may have various models associated with the user to identify various situations based upon the voice information received through a microphone. For example, changes in tone may indicate a user is sick (e.g., a sore throat). In other scenarios, various moods of the user may be identified based on the attributes associated with the voice.

The vehicle system 100 may include a secure identity storage 109 that is utilized to securely store identity information for occupants of the vehicle 102. The secure identity storage 109 may be in communication with a status memory 111. The status memory 111 may be integrated circuits (or any other type of memory) that stores information for immediate use in the vehicle system 100. The status memory 111 may allow for quicker processing of information by storing certain information that is typically stored on the secure identity storage 109. The status memory 111 may include random access memory (RAM) or virtual memory. Thus, the controller 101 may communicate with the status memory 111 to retrieve specific information that may be utilized by the vehicle system 100. For example, if the vehicle system 100 is attempting to identify an occupant, the status memory 111 may store facial recognition data (or any other similar data) to allow quicker access and processing for the controller 101. The secure identity storage 109 may be a partition utilized for driver information, and to model an identity of an occupant with facial recognition and other occupant features (e.g., voice, mobile device data, biometric data such as a fingerprint or retina scan, etc.). For example, the security identity storage 109 may include a profile that includes a name, information, other information as well, including an associated model for each user (e.g., facial data or other biometric data, etc.). In another example, the secure identity storage 109 may have a profile that includes a name, information, and associated model for voice information associated with that user. The vehicle system 100 may utilize machine-learning to classify whether that particular person is detected as a user in the vehicle 102. Furthermore, the secure identity storage 109 may be equipped with a machine learning framework that is utilized to continually update identity information as the distinct attributes of the occupant are revealed or undergo some changes (e.g., aging, weight loss or gain, wearing eyeglass or sunglasses, wearing a hat, etc.).

The OMS 104 may be in communication with the application module 110. The application module 110 may be a software application running on a vehicle system 100, vehicle sub-system, or external device (e.g., mobile phone, tablet, cloud server, etc.). The application module 110 may have its own processing and communication element 120 to run commands and applications or utilize any processor in the vehicle 102. The application module 110 may request state and identity information from the OMS 104 in order to determine if certain applications or commands should be executed or disabled. In return, the OMS 104 may send identity and status information regarding the occupant and vehicle to the application module 110.

An identity-based access control policy 112 may be used for allowing certain features based on the identification of an occupant. The identity-based access control policy 112 may be software that defines a user and certain features or applications that the particular user may be able to utilize. Such software may utilize a look-up table or other forms of data schema to define various policies for various users of the vehicle 102. Certain scenarios or features in the vehicle 102 may be flagged to be utilized by particular individuals of the vehicle 102, while other individuals may not utilize those features in the vehicle 102. For example, a teen driver that is identified by the vehicle system 100 may only be allowed to utilize handsfree communication in certain vehicle environments (e.g., driving at a low speed), while the identity-based access control policy 112 may identify an owner of the vehicle 102 and allow handsfree communication in any scenario. In another scenario, the identity-based access control policy 112 may either allow or deny access to certain vehicle features. For example, a teen driver may not be allowed to ever utilize the radio under a certain policy.

A policy enforcement engine 114 may be utilized to enforce the rules and policies that are defined by the identity-based access control policy 112. For example, the policy enforcement engine 114 may have different policies and authentication layers for different applications. The policy enforcement engine 114 may be software that identifies the user and the associated access control policy affiliated with that user. As such, the policy enforcement engine 114 may be a firewall for data exchanged between the vehicle 102 and the application module 110. The policy enforcement engine 114 may mediate user interactions to allow or disallow operations based on the conditions defined for each application or feature in the identity-based access control policy 112. For example, the policy enforcement engine 114 may determine that a current identity/condition does not match with those defined in the identity-based access control policy 112 and thus prevent activation of an associated vehicle feature. The application module 110 may exchange user information with OMS 104 to obtain the status of any current vehicle occupants. For example, if the OMS 104 recognizes an existing or new user, the application module 110 may receive the information for the existing or new user. Consequently, the policy enforcement engine 114 may access and enforce the rules defined for the existing user or in the latter case, amend the identity-based access control policy 112 to include the new user.

The application module 110 may also update the identity-based access control policy 112 as modifications to the policies are made. The identity-based access control policy 112 may be modified according to change requests originating from authorized users or administrators. For example, a vehicle fleet manager may request an adjustment to identity-based access control policy 112 to add/remove conditions that are requisite to allow a specific vehicle feature. The application module 110 may also self-administrate by automatically adjusting identity-based access control policy 112 without the need for a human administrator. In one example, the identity-based access control policy 112 may include default rules that may be applied to certain users. For example, the identity-based access control policy 112 may disallow certain features for all new users until a policy modification is received from an authorized user. The rules may also include conditions that are based on the attributes associated with each recognized user or attributes of the vehicle context. For example, the OMS 104 may determine the age of an occupant and identity-based access control policy 112 may permit a user to drive the vehicle if an age-based restriction is met.

A data validation engine 118 may be utilized to compare OMS data in various state. The application module 110 may have its own processing and communication element that is utilized to control application based issues. The data validation engine 118 loads and enforces the assurance definition, which defines what occupant data, frequency, etc. is required from the OMS 104 and proceeds with a system operation if information is consistent. The data is implicitly being checked and can come from multiple sources (at least two sources), such as from the OMS 104 or other vehicle controllers or sensors. For example, in the context of the vehicle's voice recognition system, a highly critical feature (e.g., activation of turning on the vehicle via a voice command, dialing an emergency operator, etc.) may want the OMS 104 to provide "lipreading" (e.g., viseme) data in conjunction with speech recognition data. A less critical feature (e.g., changing a radio station or changing a track) may have less stringent assurance definitions, for example, to have the OMS 104 provide notice that the occupant was generally speaking (but no lipreading is performed) in conjunction with the speech recognition data. Even in the age-based restriction scenario in the preceding paragraph, a critical feature may want additional validation, e.g., two or more independent sources of age data (e.g., age detection by image, voice, user profile data, heart rate variation, combinations thereof, etc.).

The processing and communication element 120 may be a separate processor or transceiver, or a unit that includes both a processor combined with a transceiver. The processing and communication element 120 may be utilized to run commands and programs on the application module 110. The processing and communication element 120 may be a single or multi-core processor for processing commands, such as a computer processor, microprocessor, microcontroller, or any other device, series of devices, or other mechanisms capable of performing the operations discussed herein. The memory may store instructions and commands, such as firmware, computer code, or some combination thereof as related to the application module 110. The memory may be in any form of one or more data storage devices, such as volatile memory, non-volatile memory, electronic memory, magnetic memory, optical memory, or any other form of data storage device. In one example, the memory may include removable memory components. The processing and communication element 120 may also include a communication device, such as a BLUETOOTH transceiver. Any type of transceiver may be utilized in the processing and communication element 120 to communicate with the OMS 104. For example, the application module 110 may be stored on a mobile device and may be used to communicate with a network of the vehicle 102. In yet another embodiment, the application module may include a processing and communication element 120 that includes a transceiver that may be a wireless LAN device capable of communication over, for example (and without limitation), an 802.11 network (i.e., WiFi), or a wired network, such as a vehicle communication network (e.g., CAN bus, USB, etc.).

Figure 2:
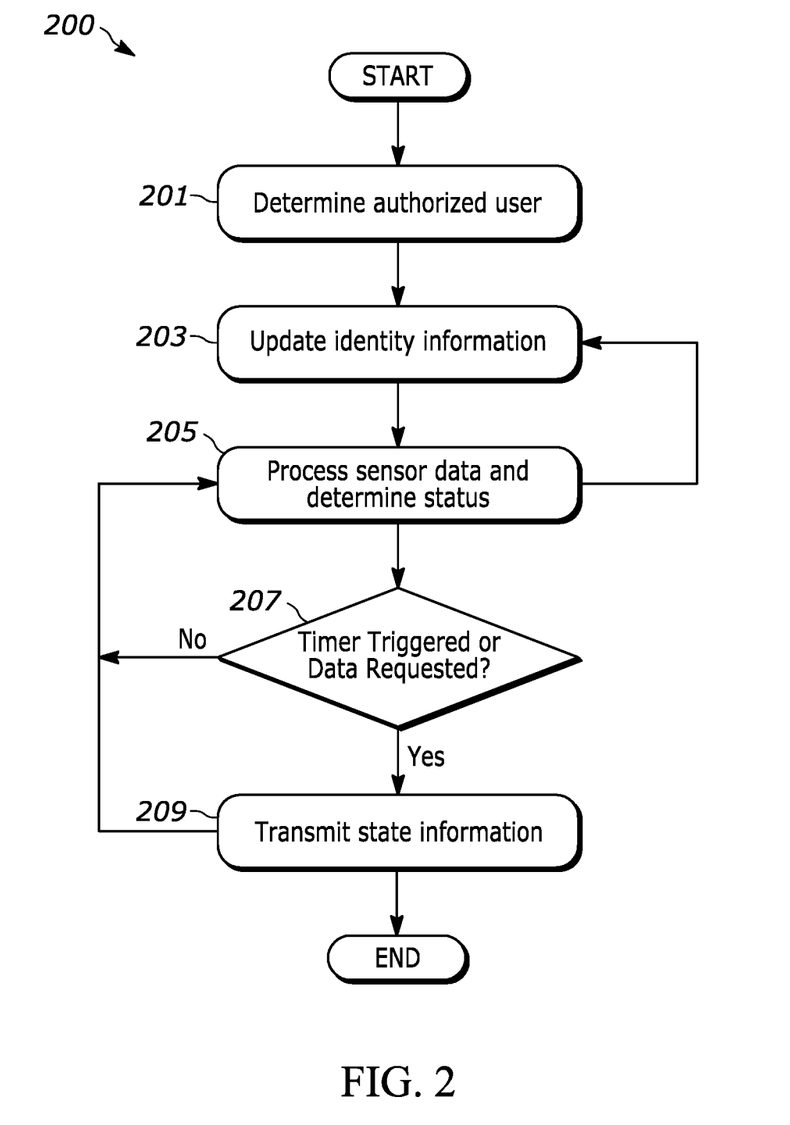
FIG. 2 illustrates an exemplary flowchart of a user authentication system 200 in one embodiment.

FIG. 2 is an exemplary flowchart of a user authentication system 200 in one embodiment. At step 201, the user authentication system 200 may determine who the user of the vehicle 102 is. Additionally or alternatively, the user authentication system 200 may determine if the user is an authorized user and allowed to access certain features. The OMS 104 may utilize various vehicle sensors or devices, such as a camera, mic, and/or data from a key fob or mobile device, to identify the user of the vehicle 102. In another example, the user authentication system 200 may work with the OMS 104 to identify whether the user is authorized to operate the vehicle 102 (e.g., drive the vehicle) or operate a vehicle function or application feature. For example, after the user is recognized, a vehicle may only have a few authorized drivers that are listed as operational. The OMS 104 may utilize facial recognition data to identify whether or not those drivers can operate the vehicle. The OMS 104 may utilize facial recognition data to identify whether or not those drivers can access a vehicle function (e.g., radio functionality, navigation system, other vehicle features, etc.). In one example, the facial recognition data may be stored in the secure identity storage 109 of the vehicle 102. In another example, the user authentication system 200 may seek to identify the user by utilizing biometric data found in the secure identity storage 109 in response to activation of a voice recognition session (e.g., voice recognition is activated by a "wake-word") or an application that is activated (e.g., via the voice recognition session). The OMS 104 may prohibit access to vehicle functions or application features if the designated criteria is not met. The OMS 104 may make this determination continually as the user interacts with the user authentication system 200 by periodically performing the recognition and criteria validation process, for example, at one second or one minute intervals. This may be beneficial over systems that activate or deactivate features based on the identity of the occupant after a single affirmation, as it may prevent cyber-attacks or erroneous authorizations, for example, when a thief attempts to steal and take possession of an occupied vehicle or when a cybercriminal infiltrates the vehicle network and attempts to control vehicle functions.

At step 203, the user authentication system 200 may update identity information of the user. The OMS 104 may collect information regarding the user each time the user accesses the vehicle 102. Thus, the OMS 104 may conduct a facial recognition scan, retina scan, acoustic pattern match, identify the mobile devices or key fob used by the user, identify certain seat positions, or other information at each use of the vehicle 102. The OMS 104 may constantly monitor data that may be representative of the user and update a database to facilitate in recognizing a user. For example, if the vehicle 102 determines that a particular user has changed the seat setting, it may update those positions to help recognize the user in future instances of entering or operating the vehicle 102. Additionally, for example, if the appearance of the user differs slightly due to changes caused by lighting, aging, or occlusions, the OMS 104 may update the identity information such that the user will be accurately recognized in future instances of vehicle usage. The OMS 104 may store identification models representing each user as stored in the secure identity storage 109 of the vehicle 102. The OMS 104 may passively perform the recognition of users without user interaction, and may augment captured identity information with information obtained from a new user registration/enrollment interface or other information generated through the import of a pre-existing model (e.g., previously generated on a mobile device, in another vehicle, etc.).

At step 205, the user authentication system 200 may process the sensor data and determine a status of the user. For example, the processor 101 of the OMS 104 may be in communication with various sensors, cameras (e.g., facial recognition camera, time of flight camera, 3D scanner, etc.), health scanners, biometric readers, etc. The user authentication system 200 may continually monitor the state of the user over a threshold period of time and thus return to step 203 continually during system operation to update the model of the recognized user during operation. This operation may occur in a non-blocking or a parallel manner to allow the processing of the sensor data while continually updating the identity information. For example, the user authentication system 200 may collect data to monitor the state of the user every minute or every thirty seconds. Thus, the user authentication system 200 may collect data to monitor the occupant over a threshold period of time in a cyclical manner (e.g., every 30 seconds, every minute, every five minutes, etc.). Some of the data that the user authentication system 200 may collect includes voice recognition data or facial recognition data, mouth-movement data, as well as other biometric data. For example, the user authentication system 200 may use the collected voice recognition or mouth-movement data to extract a time-indexed sequence of phonemes or visemes corresponding to a user's speech. In another example, the user authentication system 200 may determine that the user is asleep or awake at each cyclical sampling period. The OMS 104 may store current and/or historical state information as event objects in memory (e.g., status memory). The state information of the occupant may then be compared against an assurance interface definition 116 to trigger any activation or deactivation of application features or rejection of pending requests in response to the occupant state. This may be beneficial over systems that simply activate or deactivate features based on the identity of the occupant, as it may prevent cyber-attacks or erroneous authorizations. For example, when a compromised mobile device covertly introduces malicious voice commands by spoofing the identity of an authorized user to the vehicle 102 or when an unscrupulous passenger impersonates the identity of an inattentive authorized user.

At decision 207, the user authentication system 200 may determine if a timer trigger has lapsed. Decision 207 may also determine if data was requested by the application module 110. The timer trigger may be a threshold period that the user authentication system 200 defines to initiate an action to collect and share occupant information. For example, the threshold period may be any time in a cyclical manner (e.g., every 30 seconds, every minute, every five minutes, etc.). Any threshold period may be utilized. The system may also determine, on-demand, if an occupant information request was received from the application module 110. The data requested from the application module 110 may specify the expected occupant state information and define communication parameters, such as a threshold period, when necessary to enable and execute an application feature by referencing and reporting the requirements expressed in the assurance interface definition 116. The OMS 104 may adjust the active vehicle sensors and information determined in order to meet the application demand. If the decision 207 is not triggered, the system may return to step 205 and continue to process the sensor data.

Figure 3:
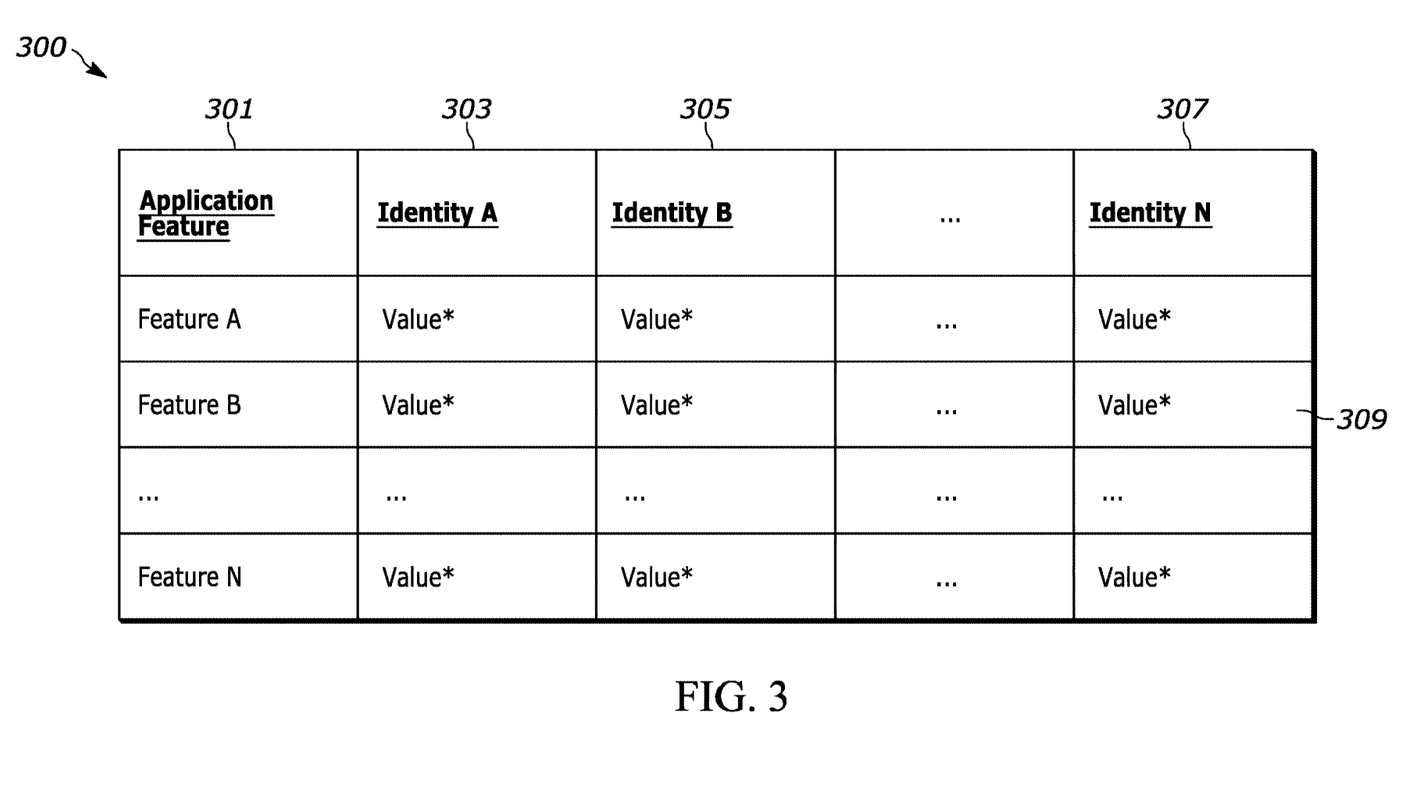
FIG. 3 illustrates an exemplary table 300 that may be utilized to authenticate various commands.

At step 209, the user authentication system 200 may transmit the state information that is associated with the user. As the OMS 104 collects and determines the state information, it may send each individual determination to the application module 110 or combine determinations into a single message that includes all user states encountered within the threshold period. As shown in FIG. 3, the user authentication system 200 utilizes a look-up table or similar array of data to identify what application features may be activated based on certain items. Additionally, data collected by the OMS 104 may be transmitted to a mobile device, remote endpoint, or another sub-system of the vehicle 102. If additional data/time is needed to satisfy the request, the user authentication system 200 may return to step 205 to process additional sensor data.

In one example, a system may apply robust user authentication based on a voice recognition system or an application. A user may request to initiate the voice recognition system utilizing a "wake-word." Identity and authorization for the request may be verified by a policy enforcement engine in reference to an identity-based access control policy. The application may refer to an assurance interface definition and request state information of a user from the OMS 104. The state information may include attributes related to the user, such as mouth-movement data, facial recognition data, voice data, etc. The user may then continue with a session utilizing the voice recognition system. A data validation engine may reference the assurance interface definition for validation and correlate processes for internal data representing the voice command with concurrently received OMS data. If a discrepancy exists, the voice command may be rejected, as the system may determine a cyber-attack or similar threat has occurred. In one example, a basic level of validation may be performed to determine that an occupant was speaking during the voice request. In another example, a higher level of validation may be performed to determine that each sound in the voice request corresponds to mouth motions as observed by the OMS. The system may then define whether a validation of the occupant has occurred.

FIG. 3 illustrates an exemplary table 300 that may be utilized to authenticate various commands. The table 300 may be an exemplary figure utilized to describe electronic data, such as a lookup table, an array, or matrix of data utilized in the system described above. The table 300 may include a heading for application feature 301. The application feature 301 may identify the name of the application or a feature/command of the application that is being executed, such as entering a destination in the navigation system, playing an audio track, calling a phone number or contact, authorizing a call to an emergency responder, turning on or off the vehicle, etc. In another example, an application may require authentication before the application may be accessed.

An identity A 303, identity B 305, . . . identity N 307, may be utilized in the table 300 to define criteria to allow a feature to be activated or deactivated. A value 309 may be either a static configuration (e.g., always allowed or denied) or based on a dynamic condition (e.g., only between a certain time period, only with windows rolled up, identity status meets certain criteria, etc.). In certain scenarios, a function or certain user may require a higher-level authentication layer based on being a safety related function. For example, when increasing a speed of the vehicle in an adaptive cruise control setting, the system may verify additional features and criteria as opposed to changing a radio station.

The processes, methods, or algorithms illustrated herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field Programmable Gate Arrays (FPGAs), state machines, controllers or other hardware components or devices, or a combination of hardware, software and firmware components. The words used in the specification are words of description rather than limitation, and it is understood that various changes can be made without departing from the spirit and scope of the disclosure. For example, the term module may describe a processor, controller, or any other type of logic circuitry that responds to and processes instructions utilized by a computer. A module may also include memory or be in communication with memory that executes instructions. Additionally, the term module may be utilized in software to describe a part of a program (or multiple programs) that have routines. Furthermore, an application may be a program or a set of software routines.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system in a vehicle, comprising:
   one or more sensors configured to obtain occupant information from an occupant, wherein the occupant information includes at least facial information of the occupant, wherein the occupant information is stored in a secure identity storage of the vehicle; and
   a controller in communication with the one or more sensors, wherein the controller is configured to:
   authenticate, utilizing the occupant information, the occupant upon accessing the vehicle;
   determine an application policy associated with one or more applications of the vehicle; and
   execute the one or more applications in response to facial information of the occupant exceeding a first authentication layer and second authentication layer associated with the application policy, wherein the application policy allows or grants access to an application based on the first authentication layer or the second authentication layer, wherein the first authentication layer is configured with utilizing at least voice information and the second authentication layer is configured to utilize both voice information and facial information, wherein a first application is configured to utilize only the first authentication layer and a second application is configured to utilize both the first authentication layer and the second authentication layer; and continuously monitor a state of the occupant over a threshold period of time during system operation to update an identification model of the occupant during operation, wherein the identification model is utilized to identify the occupant utilizing the occupant information including both voice information and facial information-.

2. The system of claim 1, wherein the one or more sensors are configured to obtain occupant information from at least voice information of the occupant in the vehicle.

3. The system of claim 2, wherein the system is configured to identify an age associated with the occupant utilizing at least the facial information and voice information.

4. The system of claim 1, wherein the facial information includes mouth-movement data associated with the occupant.

5. The system of claim 1, wherein the controller is further configured to prevent execution of the one or more applications in response to the facial information.

6. The system of claim 1, wherein the controller is further configured to deactivate operation of the one or more applications in response to facial information.

7. The system of claim 1, wherein the system is configured to obtain the occupant information from at least the facial information in a reoccurring period of operation of the vehicle.

8. The system of claim 1, wherein the system further includes a wireless transceiver in communication with a mobile device and the controller is further configured to identify the occupant utilizing at least the mobile device.

9. The system of claim 8, wherein the controller is configured to execute the one or more applications in response to the occupant.

10. The system of claim 1, wherein the controller is further configured to identify a cyber-attack if a discrepancy exists for voice validation utilizing the voice information, and the controller is further configured to require both the first authentication layer and the second authentication layer.

11. A system in a vehicle, comprising:
one or more sensors configured to obtain occupant information from one or more occupants, wherein the occupant information includes at least facial information and voice information of the one or more occupants, wherein the occupant information is stored in a secure identity storage of the vehicle;
a wireless transceiver in communication with a mobile device; and
a controller in communication with the one or more sensors and the wireless transceiver, wherein the controller is configured to:
authenticate, utilizing the occupant information, the occupant upon accessing the vehicle;
identify the occupant from at least the facial information and the mobile device;
determine an application policy associated with one or more applications, wherein the application policy is associated with at least a first authentication layer and a second authentication layer and the application policy allows or grants access to the one or more applications based on the first or second authentication layer, wherein the first authentication layer is configured with utilizing at least voice information and the second authentication layer is configured to utilize facial information, wherein a first application is configured to utilize only the first authentication layer and a second application is configured to utilize both the first authentication layer and the second authentication layer;
execute the one or more applications in response to facial information exceeding the first authentication layer or the second authentication layer associated with the application policy; and
continuously monitor a state of the occupants over a threshold period of time during system operation to update an identification model of the occupant during operation, wherein the identification model is utilized to identify the occupants utilizing the occupant information including both facial information and voice information.

12. The system of claim 11, wherein the controller is configured to obtain the facial information from the one or more occupants in a cyclical manner over a threshold period.

13. The system of claim 11, wherein the controller is further configured to determine the application policy from the one or more applications.

14. The system of claim 11, wherein the controller is further configured to execute the one or more applications in response to voice information of the one or more occupants exceed the first authentication layer or second authentication layer associated with the application policy.

15. The system of claim 11, wherein the controller is configured to obtain facial information from the one or more occupants in a cyclical manner over a threshold period.

16. The system of claim 11, wherein the one or more sensors are configured to obtain occupant information from at least voice recognition data of the one or more occupants in the vehicle.

17. The system of claim 11, wherein the first authentication layer defines one attribute associated with the occupant information, and the second authentication layer defines more than one attribute associated with the occupant information that includes a time stamp.

18. The system of claim 17, wherein the system is configured to deactivate operation of the system in the vehicle in response to voice recognition data of the one or more occupants in the vehicle.

19. A method in a vehicle, comprising:
obtaining occupant information including at least facial information and voice information from an occupant utilizing at least a camera and microphone in the vehicle;
authenticate, utilizing the occupant information, the occupant upon accessing the vehicle;
identifying the occupant utilizing at least the facial information and the voice information;
determining an application policy associated with one or more applications in response to the authentication and identification of the occupant; and
executing the one or more applications in response to facial information and voice information exceeding a first authentication layer or second authentication layer associated with the application policy, wherein the application policy allows or grants access to the one or more applications based on either the first authentication layer or second authentication layer, wherein the first authentication layer is configured with utilizing at least voice information and the second authentication layer is configured to utilize facial information and voice information, wherein a first application is configured to utilize only the first authentication layer and a second application is configured to utilize both the first authentication layer and the second authentication layer; and continuously monitor a state of the occupant over a threshold period of time during system operation to update an identification model of the occupant during operation, wherein the identification model is utilized to identify the occupant utilizing the occupant information including both voice information and facial information.

20. The method of claim 19, wherein the method further includes blocking access to the one or more applications in response to the facial information falling below the second authentication layer.

\* \* \* \* \*